United States Patent [19]

Terawaki et al.

[11] Patent Number: 5,570,190
[45] Date of Patent: Oct. 29, 1996

[54] VISUAL SENSOR COORDINATE SYSTEM SETTING JIG AND SETTING METHOD

[75] Inventors: Fumikazu Terawaki; Fumikazu Warashina, both of Oshino-mura, Japan

[73] Assignee: Fanuc Ltd., Japan

[21] Appl. No.: 284,442

[22] PCT Filed: Dec. 1, 1993

[86] PCT No.: PCT/JP93/01750

§ 371 Date: Aug. 3, 1994

§ 102(e) Date: Aug. 3, 1994

[87] PCT Pub. No.: WO94/12915

PCT Pub. Date: Sep. 6, 1994

[30] Foreign Application Priority Data

Dec. 3, 1992 [JP] Japan ..................... 4-350296

[51] Int. Cl.$^6$ .................................. G01B 11/03
[52] U.S. Cl. .................. 356/400; 348/95; 364/571.01
[58] Field of Search .................. 356/400, 375, 356/376; 364/571.01, 571.05; 348/95, 94; 901/47

[56] References Cited

U.S. PATENT DOCUMENTS 5,329,469  7/1994  Wantanabe ............... 364/571.01

FOREIGN PATENT DOCUMENTS 62-95403  5/1987  Japan .
3-287343  12/1991  Japan .
0481903  3/1992  Japan .

Primary Examiner—K. Hantis
Attorney, Agent, or Firm—Staas & Halsey

[57] ABSTRACT

A visual sensor coordinate system setting jig comprising a jig including a plurality of feature points arranged at known intervals in an array state corresponding to a visual sensor coordinate system, and a visual sensor to receive an image of the plurality of feature points of the jig, at least three of the plurality of feature points each having a distinguishing appearance which the visual sensor recognizes to discriminate the at least three feature points from the other of the plurality of feature points, the at least three feature points representing an origin and coordinate axes of the visual sensor coordinate system, and the visual sensor to identify the origin and the coordinate axes of the visual sensor coordinate system based on the array state of the plurality of feature points and the distinguishing appearance of the at least three feature points.

3 Claims, 6 Drawing Sheets

VISUAL SENSOR COORDINATE SYSTEM SETTING JIG AND SETTING METHOD

BACKGROUND OF THE INVENTION

1. Field of the Invention

The present invention relates to a coordinate system setting jig for a visual sensor used in detecting the position and attitude of an object in controlling an automatic machine such as a robot, for example, and also to a sensor coordinate system setting method using the jig.

2. Description of the Related Art

A visual sensor, which includes a camera having a CCD element array and the like and an image processing device for storing and analyzing an image picked up by means of the camera, is often used for the control of an automatic machine, such as a robot, or other similar applications. Conventionally known is a system arranged as follows. For example, in performing welding, transportation, and other operations for the workpiece by using the robot, a deviation of a workpiece as an object of operation, from its reference position or reference attitude is detected by means of one or a plurality of visual sensors, the data indicative of such deviation is transmitted as correction data for the robot position or attitude to a robot controller, and the position or attitude is corrected in accordance with the correction data as the robot executes a taught operation.

Such a system must be arranged so that a coordinate system (camera coordinate system, more specifically CCD pixel array, for example) on which the image data for the object of operation recognized by each visual sensor is based and a coordinate system (usually work coordinate system) set in the robot can be integrated, and position data (pixel value data) detected based on the former coordinate system by the individual visual sensors can be converted into data (work coordinate system data) represented by the latter coordinate system.

Usually, therefore, a sensor coordinate system, which can be recognized in common by the visual sensors and the robot controller, is established so that the pixel value data detected by the visual sensors are temporarily converted into data on the sensor coordinate system, and the resulting data are further converted into data on the workpiece coordinate system on which actual robot drive control is based. (In some cases, the sensor coordinate system may be made to be identical with the work coordinate system.)

As can be inferred from the above example of application to the control of the robot, in constructing a system intended for utilizing for various purposes the object position information detected by the visual sensors, it is usually necessary for such detected information to be arranged for the conversion into objective data. More specifically, the information, such as the pixel value data, which can only be recognized directly by the visual sensors, need to be arranged so that they can be converted into the information or the data which can be represented by an objective coordinate system. In the description to follow, the objective coordinate system will be referred to generally as the sensor coordinate system without regard to the application.

In order to convert the pixel value data into the data represented by the predetermined sensor coordinate system, it is sufficient to have the sensor coordinate system recognized by the visual sensors in any way, utilizing the CPU, image processor, memories, etc. included in the visual sensor so that the correlation between the sensor coordinate system and the pixel value can be stored in the visual sensor. After this coordinate system is established once, the data represented on the sensor coordinate system can be obtained with respect to the object recognized by the visual sensor, in accordance with the aforesaid correspondence relationship stored in the visual sensor, unless the sensor coordinate system is changed. Even in case the sensor coordinate system is changed, the sensor coordinate system set in the visual sensor can be changed by utilizing a conversion program as long as the relationship between new and old sensor coordinate systems is known.

Conventionally, in a common method for setting such sensor coordinate system, a sensor coordinate system setting jig with three feature points thereon is located in a predetermined position (e.g., fixed position on a fixed plane in a work space), the three feature points, whose positions on the sensor coordinate system are known, are caught in the field of view of the camera of the visual sensor, the pixel value data for the individual feature points are stored; and, based on these data and the known position data, the visual sensor recognizes the origin and the directions and scales (actual size of one pixel on the plane of the object, or reciprocal of scale factor on the pixel plane) of individual coordinate axes (normally X- and Y-axes) of the sensor coordinate system.

There is another method in which the feature points are increased to four or more, e.g., seven, in number, in consideration of that object is recognized through the lens system of the camera of the visual sensor, these seven feature points are recognized by the visual sensor, and the sensor coordinate system is established in the same processings. (Tsai's camera model indicates that at least seven feature points are needed when the lens system is used.)

According to the prior art described above, all of the three or more feature points must be recognized by means of the visual sensor in catching a plurality of feature points on the jig in the field of view of the camera of the visual sensor and executing the sensor coordinate system setting operation.

If the feature points are as few as three or thereabout, it is relatively easy to catch all the feature points in the camera view field of the visual sensor and coordinate the pixel data corresponding thereto to the data of the individual feature points on the sensor coordinate system. Since the lens system has aberration, it is inevitably difficult to set the sensor coordinate system accurately in consideration of image distortion which is liable to occur in the peripheral area of the field of view, in particular.

This drawback can be avoided by increasing the feature points so that they are distributed throughout the field of view of the camera. If this is done, however, another problem such that all the feature points cannot always be contained in the field of view will be encountered. For example, if an application to the robot control is assumed, for example, the actual size of the field of view of the visual sensor will inevitably have to be changed correspondingly when the size or operation area of the object of operation or required position detecting accuracy is changed.

Thus, in the case of high-accuracy position detection for small workpieces locally confined to a narrow area, the camera is located in a relatively close position, so that the actual size of the field of view is accordingly small. Thus it is necessary to prepare a small-sized jig having feature points arranged with a high array density in a narrow area.

Consequently, in the case of relatively rough position detection for large workpieces scattered in a wide area, the camera is located at a larger distance, so that the actual size of the field of view is accordingly wide. To meet this, therefore, it is desirable to prepare a large-sized jig having feature points arranged with a low array density in a wide area.

Thus, according to the prior art system, jigs of various sizes must be prepared depending on the nature of the operation, and besides, the kinds of programs to be provided for coordinate setting increase correspondingly, and the reusability of the programs lowers.

Furthermore, coupled with the previously discussed problem of the size of the field of view, when any of the feature points cannot be recognized satisfactorily, general state of the array of the feature points cannot be covered easily. Thus, it is difficult to recognize the position of the origin and the directions of the coordinate axes, and this entails a problem such that the coordinate setting itself cannot be executed normally.

SUMMARY OF THE INVENTION

The object of the present invention is to get over the above drawbacks of the prior art, and to provide a novel sensor coordinate system setting jig, which can be used in common despite variations in the actual size of the field of view depending on the nature of operation, and can set a sensor coordinate system by a relatively simple operation not necessarily requiring all of feature points to be recognized.

Further, the present invention is intended to provide a sensor coordinate system setting method which utilizes the novel jig described above.

In order to achieve the above objects, the present invention provides a visual sensor coordinate system setting jig which comprises a number of feature points (marks having a narrower extent than the lattice interval; the shape or pattern of the marks is optional and not limited to the so-called dot pattern, the same applies hereinafter) arranged at known intervals in individual lattice point positions of a lattice (the shape of each unit lattice is not limited to a square configuration; to indicate any unit having a regular array shall be called lattice hereinafter) corresponding to a visual sensor coordinate system and capable of being recognized by a visual sensor, a relatively small number of feature points, at least three, among the number of feature points, having an additional feature by which the feature points can be discriminated from the remaining feature points by means of the visual sensor, and the relatively small number of feature points, at least three, representing the origin and coordinate axes of the visual sensor coordinate system by an array state identifiable of being identified by the visual sensor or a feature of the feature points themselves, and furthermore the present invention contrives a visual sensor coordinate system setting method which comprises a step of locating the jig in position; a step of observing a number of feature points on the visual sensor coordinate system setting jig by the visual sensor and recognizing the origin and coordinate axes of the visual sensor coordinate system in accordance with the array form of the relatively small number of feature points, at least three, or the feature of the feature points themselves; and a step of recognizing the corresponding positions of the individual lattice points on the visual sensor coordinate system in accordance with the contents of the recognition.

DETAILED DESCRIPTION OF THE PREFERRED EMBODIMENTS

Referring first to examples shown in FIGS. 1 to 3, the principle, on which a feature point array provided on a jig according to the present invention is recognized by a visual sensor and utilized for establishing the sensor coordinate setting will be described.

Figure 1:
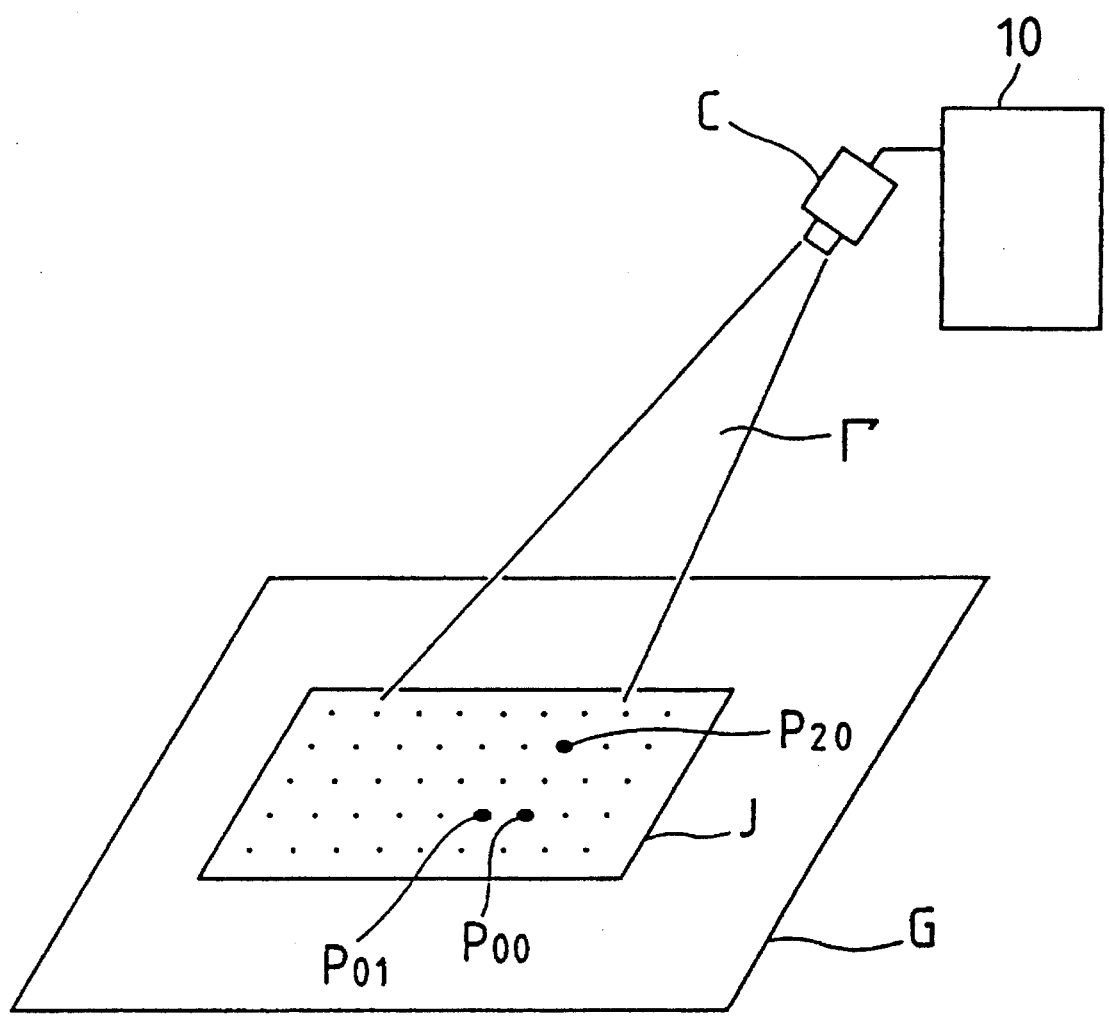
FIG. 1 is a conceptual diagram showing an arrangement used in setting a sensor coordinate system in a visual sensor by means of a jig according to the present invention.

FIG. 1 shows the way a jig J, in the form of a thin plate located in a predetermined position on a work plane G (one fixed plane in a work space for the case a three-dimensional operation is assumed), is shot by a camera C, which is connected to an image processing device 10, to establish a sensor coordinate system. The optical axis of the camera C is inclined at an angle to the work plane G and hence, to the surface of the jig, and the camera catches in its visual range Γ a region which includes the central portion of the feature point array of the jig J.

Figure 2A:
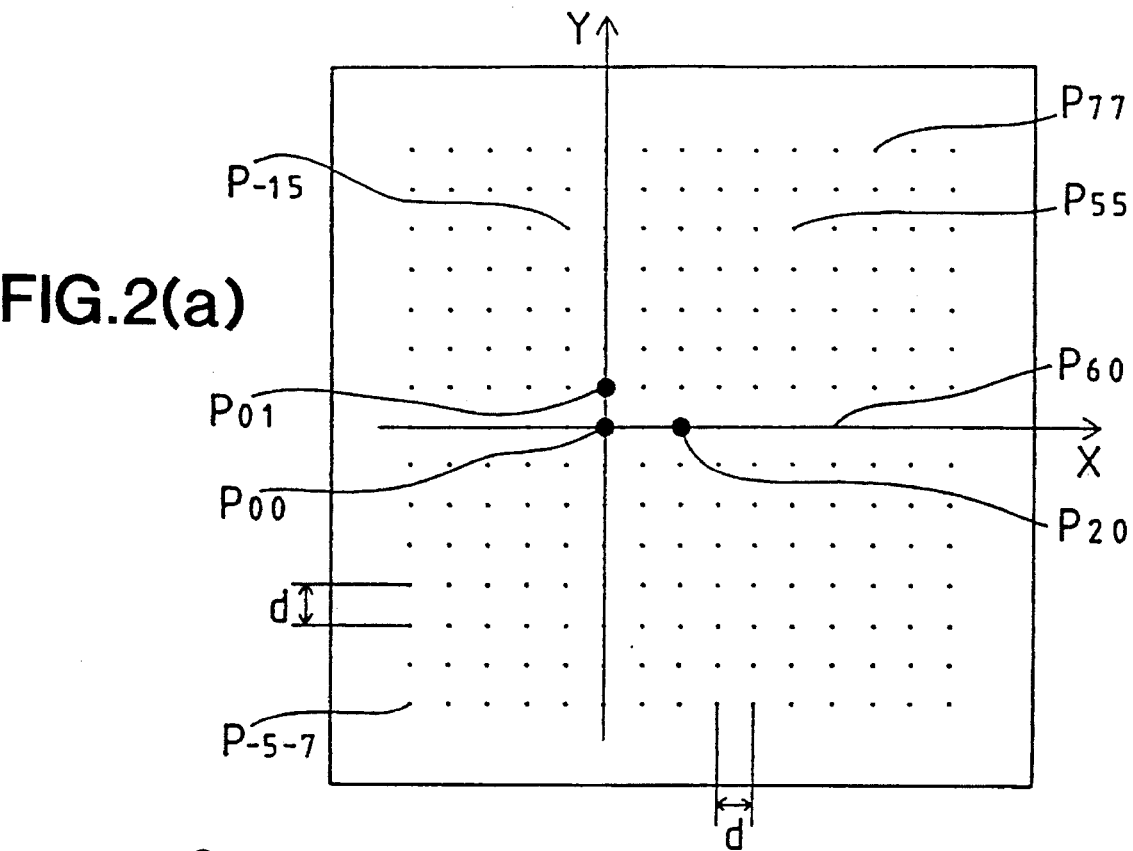
FIG. 2(a) is a diagram showing a feature point array according to one embodiment of the jig of the present invention.

Various versions of the feature point array of the jig J may be contrived. For example operation will be described for the case in which the one shown in FIG. 2(a) is used. FIG. 1 shows only some of feature points. The feature points of the jig J are arranged at known intervals d in the form of a lattice. Among these feature points, $P_{00}$ $P_{20}$ and $P_{01}$ are given an additional feature (here large black dots or large-area black dots) by which they can be discriminated from the other feature points (small black dots or marks). A straight line from the feature point $P_{00}$ to $P_{20}$ is given as the X-axis, and a straight line from the feature point $P_{00}$ to $P_{01}$ as the Y-axis. A coordinate system having this $P_{00}$ as its origin is supposed to be established as the sensor coordinate system in the visual sensor.

Viewing the whole feature point array, feature points $P_{mn}$ (m=−5, −4, . . . , 6, 7; n=−7, −6, . . . , 6, 7) are provided on lattice points which are situated at distances md in the X-axis direction and distances nd in the Y-axis direction from the origin $P_{00}$. In other words, the coordinate values of the feature points $P_{mn}$ are given by [md, nd].

Figure 2B:
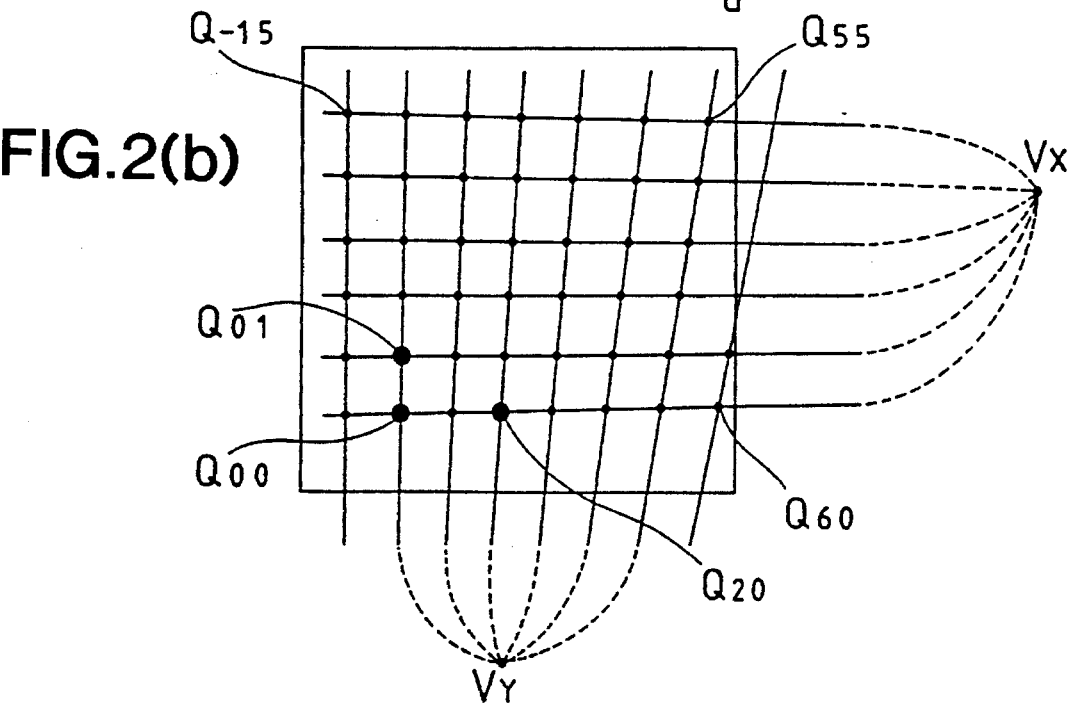
FIG. 2(b) is a diagram showing the state of an image obtained by shooting the array by a camera.

FIG. 2(b) shows the way the feature point array is imaged on a pixel plane of the camera C or a screen for displaying the same. Since the camera C is inclined at an angle to the work plane G (feature point array plane), a lattice formed by a map $\{Q_{mn}\}$ of the feature point array $\{P_{mn}\}$ is distorted from a set of squares, corresponding to the direction of inclination (direction of a normal vector from the pixel plane). In the drawing, $Q_{mn}$ represents map points for the feature points $P_{mn}$. Thus, the large-black-dot feature points $P_{00}$, $P_{20}$ and $P_{01}$ are mapped on $Q_{00}$, $Q_{20}$ and $Q_{01}$, respectively. $V_x$ and $V_y$ conceptually represent vanishing points of individually mapped lines of lattice.

The feature points $P_{00}$, $P_{20}$ and $P_{01}$ having the additional feature are given a conspicuous feature which can be easily discriminated by means of the image processing device 10 of the visual sensor. Since these few additional feature points are located within a relatively narrow range around the origin, such as the central portion of the jig, it is to contain all of them (normally within three or three plus several in number) securely in the camera view field.

The jig or the feature point array thereof is designed relatively larger to prepare for the case that a relatively large area can be covered with the field of view. Thus, the camera field of view is unable to cover all the feature points even in the case shown in FIG. 2. More specifically, although $P_{55}$, $P_{60}$, etc. are contained in the camera view field, $P_{77}$, $P_{-5-7}$, etc. are outside the camera view field. It is a remarkable feature of the present invention that the sensor coordinate system can be set without any hindrance at all even in such a situation.

The following is a description of the principle on which the coordinate setting is executed in this precondition. First, the visual sensor is made to recognize the images $Q_{00}$, $Q_{20}$ and $Q_{01}$ of the three additional feature points $P_{00}$, $P_{20}$ and $P_{01}$, and is given, as an instruction, the correspondence of the respective (central) pixel values $I_{00}=(\alpha, \beta)$, $I_{20}=(\alpha, \beta)$ and $I=(\alpha, \beta)$ of Q, Q and $Q_{01}$ to the respective coordinate values [0, 0], [2d, 0] and [0, d] of $P_{00}$, $P_{20}$ and $P_{01}$, Here ($\alpha$, $\beta$) indicates that a pixel corresponding to (the center of) $Q_{ij}$ is the pixel in the $\alpha$ 'th row and $\alpha$ 'th column of a matrix which a pixel array forms. The additional feature points $P_{00}$, $P_{20}$ and $P_{01}$ can be discriminated by the other feature points by only causing the visual sensor to extract the feature points which have the additional feature (large area in this case).

If this is done, then the visual sensor can be considered to have fetched minimum necessary information for the determination of the origin and the directions and scales of the X- and Y-axes of the sensor coordinate system. The X- and Y-axes can definitely be discriminated by a feature of the array, $P_{01}-P_{20}$ distance>$P_{00}-P_{20}$ distance>$P_{00}-P_{01}$ distance. The method for extracting the additional feature points is not limited to the method which utilizes the aforesaid relationships of the distances between the points. For example, the distinctions between $Q_{00}$, $Q_{20}$ and $Q_{01}$ may be taught to the visual sensor so that the origin and the directions and scales of the X- and Y-axes of the sensor coordinate system can be determined thereby, in accordance with information that the three points $Q_{00}$, $Q_{20}$ and $Q_{01}$ form a triangle and that angles $Q_{20}Q_{00}Q_{01}$, $Q_{00}Q_{01}Q_{20}$ and $Q_{00}Q_{20}Q_{01}$ are approximately 90°, 60° and 30°, respectively, on condition that the camera is not inclined extremely. Also, the condition, angle $Q_{20}Q_{00}Q_{01}$>angle $Q_{00}Q_{01}Q_{20}$>angle $Q_{00}Q_{20}Q_{01}$, may be used.

When the teaching of the correspondence of the pixel values $I_{00}$, $I_{20}$ and $I_{01}$ to the respective coordinate values [0, 0], [2d, 0] and [0, d] of $P_{00}$, $P_{20}$ and $P_{01}$ is completed in this manner, estimated values $I'_{mn}=(\alpha', \beta')$ of the pixel values of $Q_{mn}$ corresponding to all of residual lattice points can be obtained in accordance with data for the respective pixel values $I_{00}=(\alpha, \beta)$, $I=(\alpha, \beta)$ and $I_{01}=(\alpha, \beta)$ of the three points.

Measured data of the pixel values of $Q_{mn}$ corresponding to all the remaining lattice points are seized by the visual sensor as far as the recognition of the feature points has not failed, except only that provided the correspondence between the individual data and m and n is not determine. It is necessary, therefore, only that the measured data and m and n be coordinated by utilizing the aforesaid estimated values.

In consideration of the possibility of wrong recognition of the feature points, however, abnormal measured values can be excluded by setting a suitable allowable value Δ or by other means, or otherwise, the estimated values can be settled by utilizing an interpolation method based on measured values corresponding to other reliable adjacent lattice points.

Based on the principle described above, m and n can be coordinated with respect to all feature point images $\{Q_{ij}\}$.

Naturally, it is to be understood that the method for determining the individual pixel values $I_{ij}$ for all the feature point images $\{Q_{ij}\}$ is not limited to the method described above. For example, it is evident that the same result can also be obtained by a method such that pixel values, such as $Q_{10}$, $Q_{30}$, $Q_{40}$, $Q_{50}$, $Q_{02}$, $Q_{03}$, $Q_{04}$, $Q_{05}$, etc., on the images of the X- and Y-axes are first detected from the observed values and settled, and selection and settlement of the most approximate observed value, among remaining observed values for the nearest points Q, are repeated in succession.

If a state is attained such that m and n are settled for all the feature point images $\{Q_{ij}\}$ is attained, the coordinate values [md, nd] of $P_{ij}$ on the sensor coordinate system are coordinated with the individual pixel values $I_{mn}$, whereupon setting the sensor coordinate system is substantially completed.

That is, the pixel value data for (the center of) an image obtained when a specific point (e.g., center of a workpiece) of an optional object is observed can be converted into data on the sensor coordinate system in accordance with a suitable conventional computation, such as the interpolation method based on the pixel value data for the individual lattice points.

If $I_{mn}$ is obtained, the respective positions of the vanishing points $V_X$ and $V_y$ on the pixel plane can be computed, so that the direction (directional cosine) of the optical axis of the camera can also be computed on the basis of the computation result. In detecting the three-dimensional position of the object by means of a plurality of visual sensors, this information on the direction of the optical axis is utilized.

The above is a description of the function or the principle of coordinate setting for the case in which the jig shown in FIG. 2(a) is used. Alternatively, however, a jig may be designed either for providing varied additional features or for locating no additional feature point on the origin. FIG. 3 shows an example of this arrangement.

Figure 3:
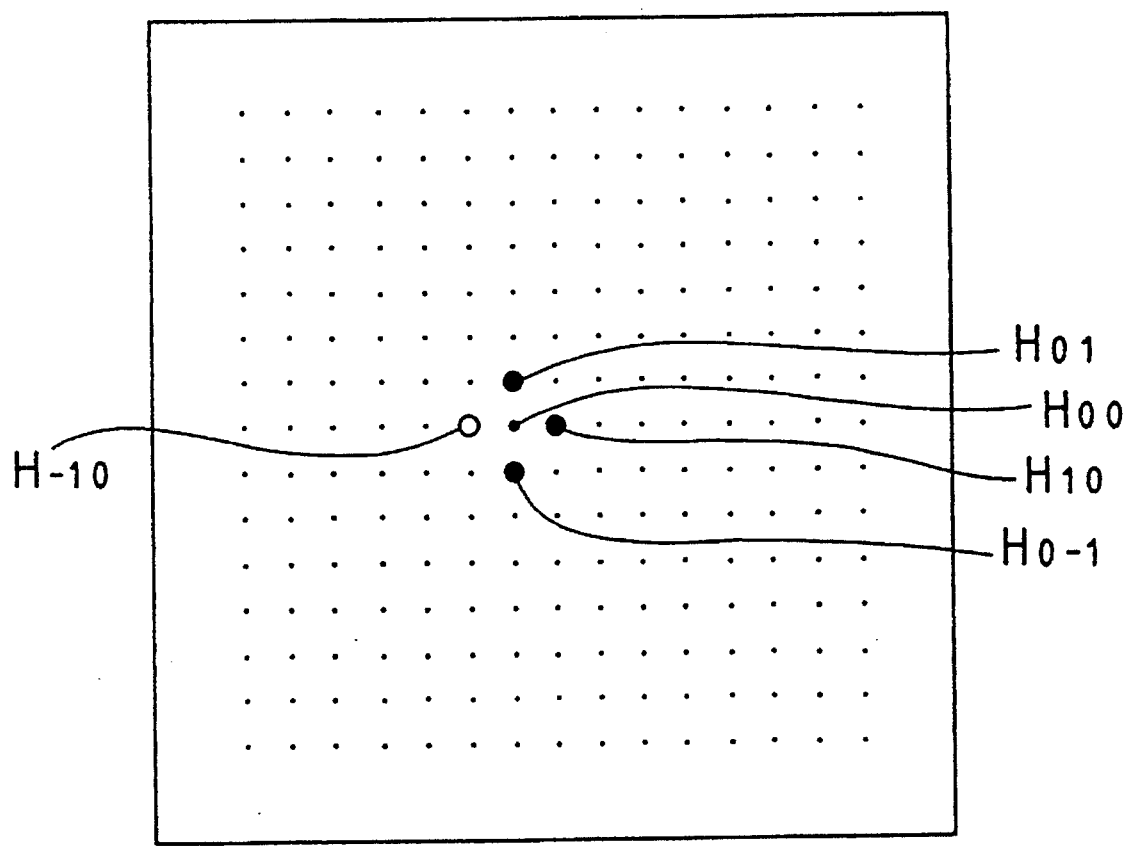
FIG. 3 is a diagram showing a feature point array according to another embodiment of the jig of the present invention.

The following is a brief description of a feature point array of the jig shown in FIG. 3. There are two types of additional feature points, large black dots and large white circles. The sensor coordinate system is set on condition that point of intersection of a segment connecting a large white circle $H_{-10}$ and a large black dot $H_{10}$ and a segment connecting a large black dot $H_{0-1}$ and a large black dot $H_{01}$ represents the origin $H_{00}$, a straight line extending from the large white circle $H_{-10}$ to the large black dot $H_{10}$ represents the X-axis, and a straight line directed from the large black dot $H_{0-1}$ to the large black dot $H_{01}$ represents the Y-axis. It is to be understood without any special explanation that the sensor coordinate system can be set in accordance with the same principle as the one described in connection with the case of FIG. 2.

Figure 4:
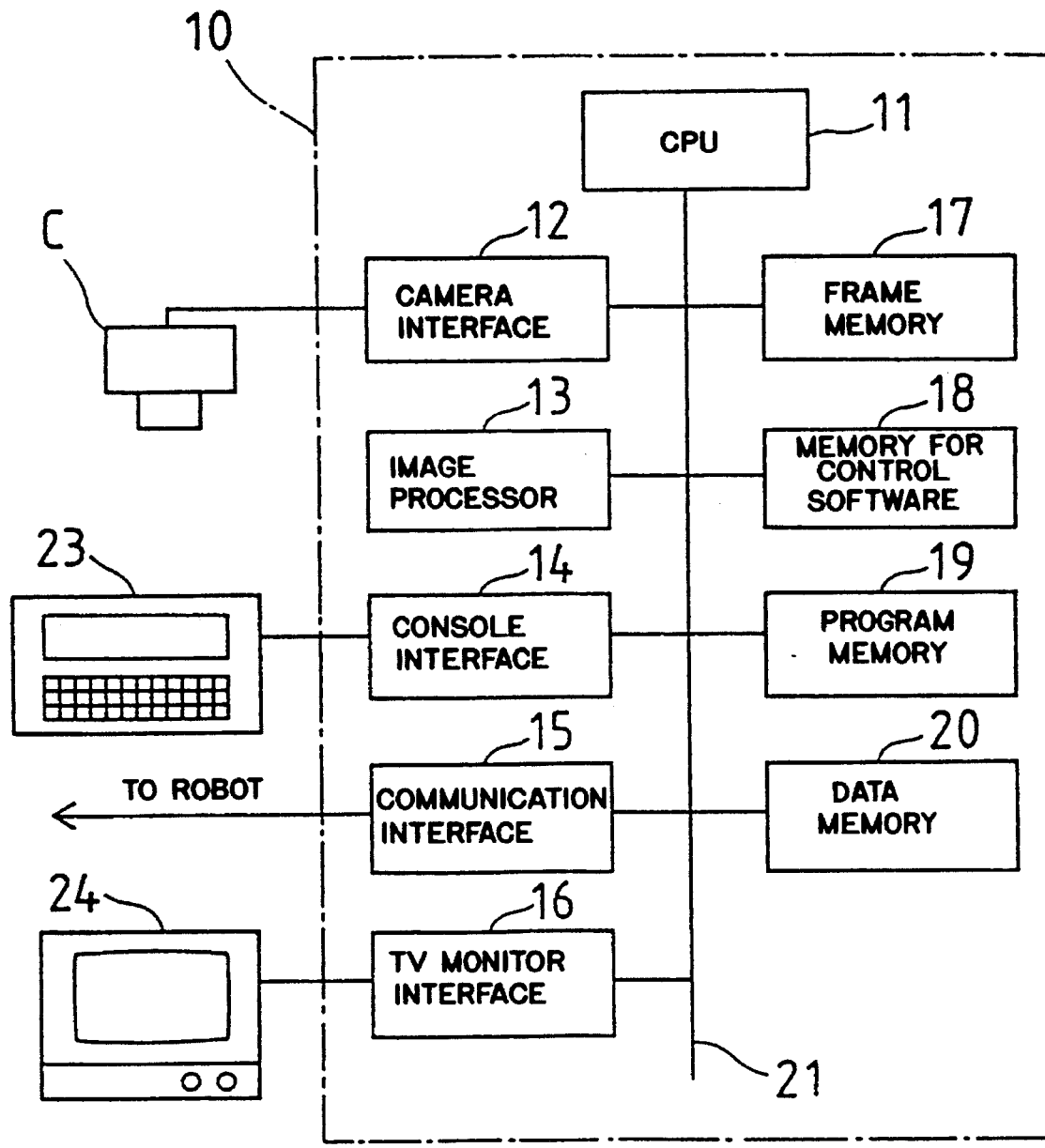
FIG. 4 is a block diagram showing the principal part of an example of an image processing device used in carrying out a sensor coordinate setting method using the jig of the present invention.
Figure 5:
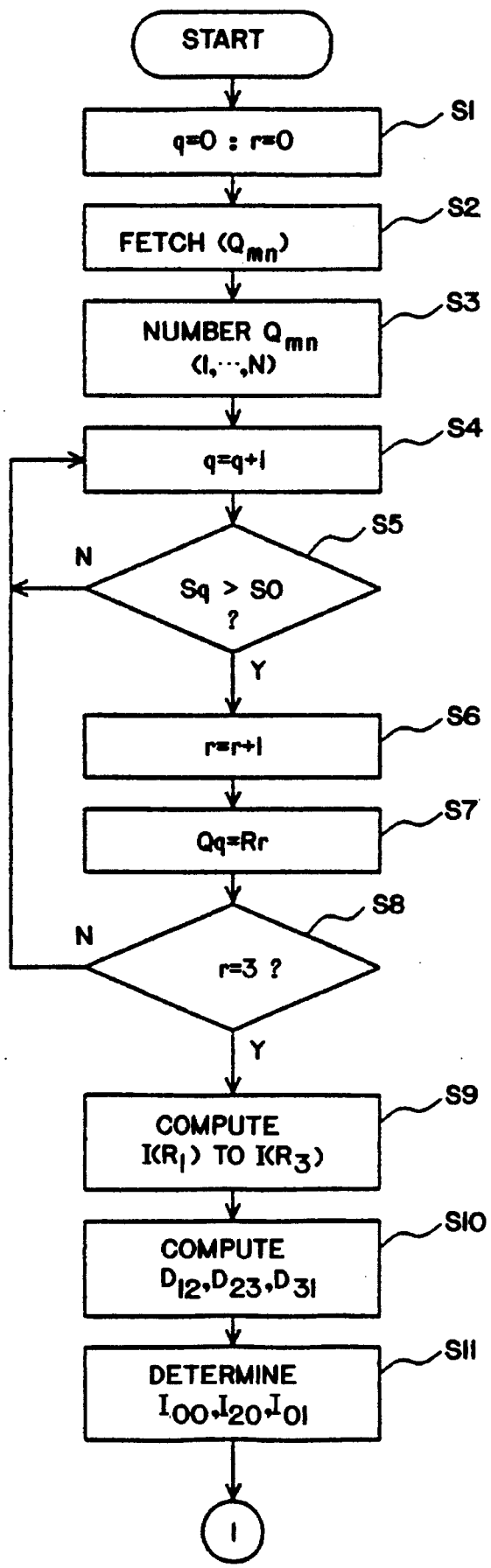
FIG. 5 shows the first half of a flow chart illustrating an example of a processing for carrying out the sensor coordinate system setting method of the present invention.
Figure 6:
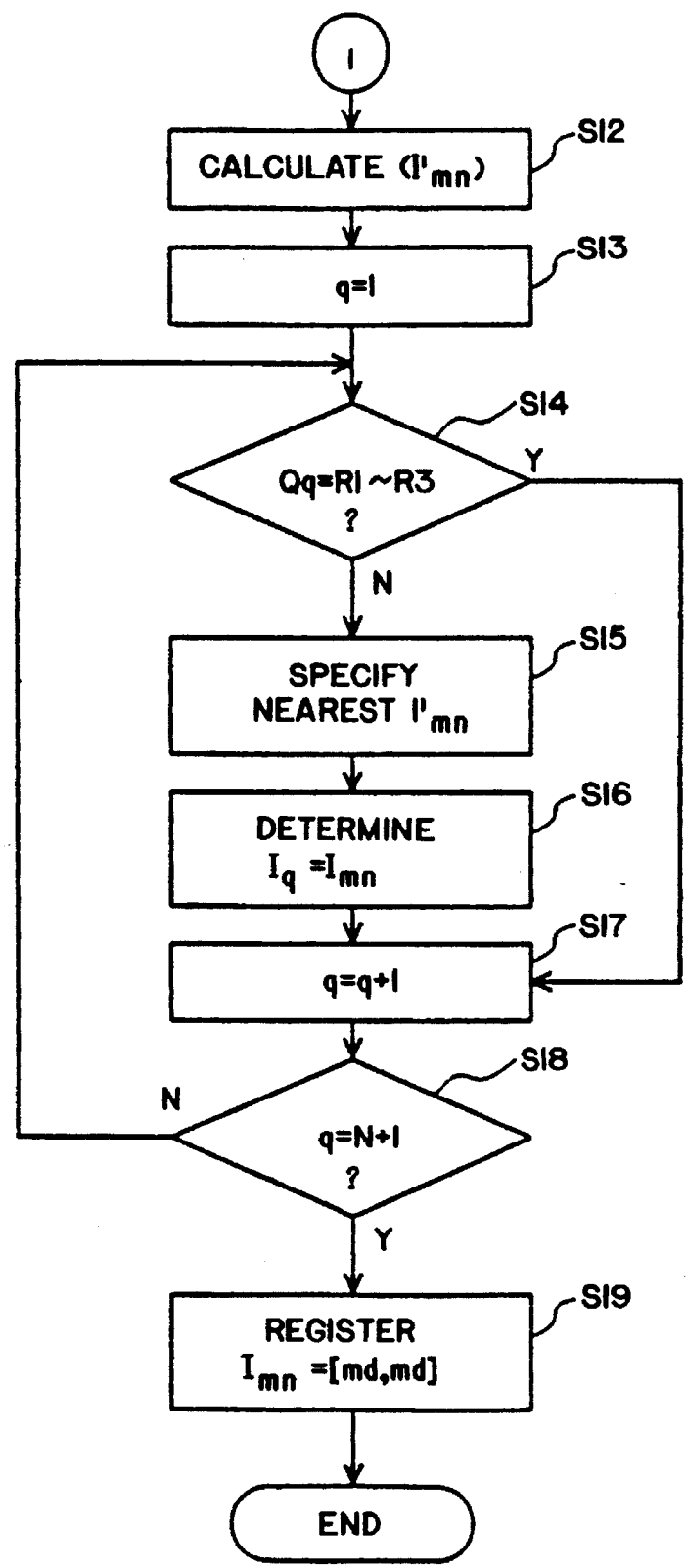
FIG. 6 shows the second half of the flow chart illustrating the example of the process for carrying out the sensor coordinate system setting method of the present invention.

Referring additionally to FIGS. 4, 5 and 6, an example of a procedure for setting coordinates by a sensor coordinate system setting method according to the present invention will now be described. According to this procedure, the jig J of FIG. 2(a), as an example of the sensor coordinate system setting jig according to the present invention, is arranged in the manner shown in FIG. 1, and it is shot by means of the camera of the visual sensor.

FIG. 4 is a block diagram illustrating the camera C, which constitutes the visual sensor used to carry out the present invention, and the principal part of the image processing device 10 connected thereto. In the drawing, the image processing device 10 includes a central processing unit (hereinafter referred to as CPU) 11. The CPU 1 is connected, by means of a bus 21, with a camera interface 12, image processor 13, console interface 4, communication interface 15, TV monitor interface 16, frame memory 17, memory 18 for control software formed of a ROM, program memory 19 formed of a RAM, and data memory 20 formed of a nonvolatile RAM. The camera interface 12 is connected with the camera C which catches the jig J in its view field Γ in the manner shown in FIG. 1. Several such cameras C are connected as required, and are arranged so as to detect the position of an object of working (e.g., workpiece to be machined) on the work plane G after the sensor coordinate system is set, as well as to transmit data for position correction to a robot which is connected to the communication interface 15.

The several cameras C, though only one of which is illustrated, sometimes may be connected simultaneously to the communication interface 15 for the operation. In this case, for example, a common sensor coordinate system is set for the individual cameras.

An image picked up by the camera C is converted into a gradational image which is converted into a gray scale, and is loaded into the frame memory 17. The image processor 13 serves to process the image data stored in the frame memory 17, recognize the images $Q_{mn}$ of the feature points $P_{mn}$ of the jig J, and detect their positions (corresponding pixel values; central pixel values if the images have an extent).

The console interface 14 is connected with a console 23, which includes various command keys and an input unit for performing operations such as entry, editing, registration, execution, etc. of application programs, besides an output unit. The output unit can display, for example, lists of menus and programs used to set various data.

The memory 18 for control software is loaded with a control program with which the CPU 11 controls the visual sensor system. The program memory 19 is loaded with programs which are created by a user.

The communication interface 15 is connected with an automatic machine (robot in this case) or the like which utilizes position information on the work or the like detected by the visual sensor. On the other hand, the TV monitor interface 16 is connected with a TV monitor 24 which can selectively display the image being shot by means of the camera C or the image stored in the frame memory 17.

Although the above-described arrangement is basically the same as the arrangement of a conventional visual sensor system, it differs from the conventional system arrangement in that the memory 18 for control software or the data memory 20 is loaded with programs and data ($S_0$, d, etc.), which are necessary for the execution of processings such as the ones shown in the flow charts of FIGS. 5 and 6, in carrying out the present invention.

If the aforesaid sensor coordinate setting programs are supposed to have already been registered and stored in the memory 18 for control software, a preliminary operation or first thing to do for setting the sensor coordinate system is to set the cameras C to be used in the image processing device 10. For example, this setting is achieved by assigning connector numbers in the camera interface 12, when setting coordinate systems are set for selected ones of the cameras which are connected to the camera interface.

When the setting the cameras C is finished, the data for the jig J are stored in the data memory 20. When using the jig according to the present invention, particularly important input data are those data which for discriminating the distance d between the lattice points on which the feature points are arranged, from the additional feature.

In the case where several types of jigs (e.g., two 10 types shown in FIGS. 2 and 3) are used properly or in the case where two- or three-dimensional sensor coordinate setting is selected correspondingly, codes for specifying the types of the jigs and coordinate setting and codes and data for specifying algorithms necessary for recognizing the origin and coordinate axes and settling coordinate values corresponding to the individual lattice point images in accordance with the images of the additional feature points are inputted or assigned.

If the data for the jig are necessary for the operation of the robot, such requirement can be met by inputting such data to a memory in a robot controller (not shown) through the communication interface 15.

Referring now to the flow charts of FIGS. 5 and 6, described below is an example of a processing operation of the image processing device 10, in which the sensor coordinate system setting is executed by using the jig J according to the present invention shown in FIG. 2, on the basis of the aforesaid preparations.

First, the coordinate setting operation is started when an operator gives a sensor coordinate setting start command from the console 23. In selecting the type of the jig J and the type of the contents of sensor coordinate setting, codes for specifying the types of the jig and coordinate setting and codes for specifying the algorithms are assigned, and the specified codes and necessary incidental data are loaded for the data memory 20 (START). Immediately after the start, a feature point image number index q and an additional feature point number index r are adjusted for being q=r=0 (Step S1), whereupon pickup the image by the camera C is started. An image being shot by means of the camera C is fetched by the frame memory 17, the feature point images in the view field is recognized by the image processing device 10 (Step S2), numbers 1, 2, . . . , N are assigned to the feature point images in proper order, and the images, along with corresponding pixel values, are stored in the data memory 20 (Step S3).

When the storage of the feature point data is finished, 1 is added to the feature point number index q (Step S4). In a first processing, q=1 is obtained. Then, a feature point image $Q_1$ with a first number is checked to see if its image is a large black dot in terms of whether or not its area $S_q$ is greater than the aforesaid set value $S_O$ (Step S5). The area of each image can be determined by counting pixels which constitute an image $Q_q$. If the image is a large black dot, 1 is added to the additional feature point number index r (Step S6), and the resulting value is then identified and stored as $Q_q=R_r$, that is, data of an r'th additional feature point (Step S7).

If $Q_q$ is not a large black dot image, the program returns to Step S4, whereupon 1 is added again to the feature point number index q, and the program advances to Step S5. Before all of three large black dot images $R_1$, $R_2$ and $R_3$, equal in number to the large black dots (additional feature points) of FIG. 2(a) are detected the decision in Step S8 next to Step S7 is NO, and so after the program returns again to Step S4, Steps S4 to S8 are repeated.

When all the three large black dot images $R_1$, $R_2$ and $R_3$ are detected, the decision in Step S8 is YES, whereupon central pixel values $I(R_1)$, $I(R_2)$ and $I(R_3)$ of the large black dot images $R_1$, $R_2$ and $R_3$ are computed, and the result is loaded into the data memory 20 (Step S10). In this stage, the correspondent relationship between $I(R_1)$, $I(R_2)$ and $I(R_3)$ and $P_{00}$, $P_{20}$ and $P_{01}$ is not recognized.

Using the aforesaid data $I(R_1)$, $I(R_2)$ and $I(R_3)$, therefore, a distance $D_{12}$ between $I(R_1)$ and $I(R_2)$ on the pixel plane, distance $D_{23}$ between $I(R_2)$ and $I(R_3)$ on the pixel plane, and distance $D_{31}$ between $I(R_3)$ and $I(R_1)$ on the pixel plane are computed individually (Step S10). In the order of the magnitude of these distances, $I(R_1)$, $I(R_2)$ and $I(R_3)$ are made to correspond equally to $P_{00}$, $P_{20}$ and $P_{01}$ on 1-to-1 basis, and the individual pixel values are determined as $I_{00}$, $I_{20}$ and $I_{01}$ (Step S11).

For example, if $D_{12}>D_{23}>D_{31}$ is given, for example, $R_3$ is an image of $P_{00}$ on the origin, $R_2$ is an image of the point $P_{20}$, and $R_1$ is an image of $P_{01}$. Thus, relationships, $I(R_1)=I_{01}$, $I(R_2)=I_{20}$, and $I(R_3)=I_{00}$, are established. Likewise, if $D_{23}>D_{12}>D_{31}$, relationships, $I(R_1)=I_{00}$, $I(R_2)=I_{20}$, and $I(R_3)=I_{01}$, are established (see FIG. 5 for the above steps).

When the recognition of the additional feature points is completed in this manner, the estimated values $I'_{mn}$ of the pixel values of the residual feature point images are computed in accordance with the recognition (Step S12: see FIG. 6 from this step on). For the computation method, as mentioned in connection with the description of the function, it is necessary only to make computations corresponding to the aforementioned equations (1) and (2) be executed.

Thereupon, the feature point image number index q is restored to 1 (Step S13), and a processing is started to determine the estimated pixel values $I'_{mn}$ to which the individual feature point images correspond.

First, it is determined whether or not $Q_1$ is any of $R_1$ to $R_3$ (Step S14). When YES, since the pixel values are already determined in Step S11, they are not the objects of coordination with the estimated pixel values, and the program advances to Step S17, whereupon 1 is added to the feature point number index q. Subsequently, it is checked whether or not the processing of all of N number of feature points is finished (Step S18). Unless it is finished, the program returns to Step S14.

If the decision in Step S14 is NO, there should be only one estimated value $I'_{mn}$ which is approximate to a measured pixel value $I_q$ (central pixel value if there are a plurality of values) of $Q_q$. Then, according to equation (3) mentioned in connection with the description of the function, distances, $\Delta q$–10, $\Delta q$–30, $\Delta q$–40, . . . , $\Delta q$–77, . . . , $\Delta q$–5–7, between I and the individual estimated values $I'_{mn}$ are computed, (m, n) which gives the minimum distance $\Delta q$–mn is obtained (Step S15), and the corresponding pixel value $I_q$ is determined as $I_{mn}$ (Step S16).

Thus, the aforesaid processings of Steps S13 to S18 are executed for all $Q_q$ (q=1, 2, . . . , N) caught in the field of view of the camera C, whereupon the feature points $P_{mn}$ corresponding to the pixel values of all $Q_q$ recognized by the camera are determined.

If this correspondent relationship is established, pixel values corresponding to the individual lattice points [md, nd] can be settled, since the coordinate values of the feature points $P_{mn}$ on the sensor coordinate system are given by lattice point coordinate values [md, rid]. This correspondent relationship, along with necessary incidental data, is loaded into the data memory 20 (Step S19) in order to be registered in the image sensor, whereupon setting the sensor coordinate system is finished (END).

That is, after this, the position or region of a plane, at which or in which the jig J is placed corresponds to the image recognized by any given pixel, can always be computed by the reverse calculation based on the pixel data of the registered individual lattice points. Thus, by previously registering a program for the reverse calculation in the memory 18 for control software or the robot controller, image information detected by the visual sensor can be converted into data on the sensor coordinate system as an objective coordinate system and utilized for control robot control and the like.

As described above, according to the present invention, the jig is provided with a few additional feature points which can be discriminated from the other feature points and represent the origin and the directions and scales of the coordinate axes. Even though the actual size of the view field varies depending on the nature of the operation, therefore, fundamental data for the sensor coordinate system can easily and surely be obtained. As far as such few additional feature points can be recognized, the operator can set the sensor coordinate system by a simple operation without paying attention to whether the other feature points are in the view field or whether they are recognized successfully.

Moreover, even when a considerable portion of the feature points is out of the field ov view, this will not cause any problem so that troublesome operations, such as preparing jigs of different sizes for the individual operations and resetting the coordinate system, can be eliminated. Thus, the operating efficiency can be improved largely.

Not only all the feature points need not be recognized, but also all the data for the recognized feature points can be utilized efficiently as the data for the connection between the camera coordinate system and the sensor coordinate system, so that the coordinate setting in consideration of those marginal areas of the camera view field where the image is liable to be distorted but without substantially caring about the relation between the jig size and the camera view field, thereby contributing to the improvement of the detecting accuracy of the visual sensor.

We claim:

1. A visual sensor coordinate system setting jig comprising:

a plurality of feature points of a jig arranged at known intervals in an array state corresponding to a visual sensor coordinate system; and a visual sensor to receive an image of said plurality of feature points of said jig, at least three of said plurality of feature points each having a distinguishing appearance which said visual sensor recognizes to discriminate said at least three feature points from the other of said plurality of feature points, said at least three feature points each having said distinguishing appearance representing an origin and coordinate axes of said visual sensor coordinate system, and said visual sensor to identify said origin and said coordinate axes of said visual sensor coordinate system based on said array state of said plurality of feature points and said at least three feature points each having said distinguishing appearance.

2. A visual sensor coordinate system setting method comprising the steps of:

locating a plurality of feature points of a jig arranged at known intervals in an array state corresponding to a visual sensor coordinate system;

receiving an image of said plurality of feature points of said jig;

discriminating at least three of said plurality of feature points each having a distinguishing appearance from the other of said plurality of feature points, said at least three feature points each having said distinguishing appearance representing an origin and coordinate axes of said visual sensor coordinate system; and identifying said origin and said coordinate axes of said visual sensor coordinate system based on said array sate of said plurality of feature points and said at least three feature points each having said distinguishing appearance.

3. A visual sensor coordinate system setting method according to claim 2, further comprising the step of recognizing the corresponding positions of said plurality of feature points in said array state on said visual sensor coordinate system in accordance with said identifying step.

* * * * *